United States Patent
Nam et al.

(10) Patent No.: US 8,120,636 B2
(45) Date of Patent: Feb. 21, 2012

(54) METHOD FOR PERFORMING RECORDING OPERATION IN VIDEO COMMUNICATION MODE OF WIRELESS TERMINAL AND WIRELESS TERMINAL IMPLEMENTING THE SAME

(75) Inventors: Soo-Young Nam, Gumi-si (KR); Chae-Whan Lim, Daegugwangyeok-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1541 days.

(21) Appl. No.: 11/541,651

(22) Filed: Oct. 3, 2006

(65) Prior Publication Data

US 2007/0120964 A1 May 31, 2007

(30) Foreign Application Priority Data

Oct. 24, 2005 (KR) .................. 10-2005-0100294

(51) Int. Cl.
 *H04N 7/14* (2006.01)
(52) U.S. Cl. ................ 348/14.02; 348/14.01; 348/14.12
(58) Field of Classification Search .... 348/14.01–14.16, 348/207.99; 455/556.1, 556.2, 557; 370/328, 370/349
See application file for complete search history.

(56) References Cited

U.S. PATENT DOCUMENTS

| 7,221,385 B2 * | 5/2007 | Hamada ............... 348/14.02 |
| 2002/0180864 A1 | 12/2002 | Nakamura et al. |
| 2004/0071106 A1 * | 4/2004 | Ito et al. ............... 370/328 |
| 2004/0078821 A1 | 4/2004 | Frisco et al. |
| 2005/0157174 A1 * | 7/2005 | Kitamura et al. ........ 348/207.99 |

FOREIGN PATENT DOCUMENTS

EP    1 185 105 A2    3/2002

* cited by examiner

*Primary Examiner* — Melur Ramakrishnaiah
(74) *Attorney, Agent, or Firm* — Roylance, Abrams, Berdo & Goodman, LLP

(57) ABSTRACT

A method for performing a recording operation in a video communication mode of a wireless terminal are provided, where the video communication mode of the wireless terminal is switched to a recording mode for performing the recording operation, and video data are evaluated to determine if received in the recording mode of video communication. When the video data are not received, although a predetermined time passes, the recording mode of the video communication is performed while inserting preset substitution image data. When the video data are received before the predetermined time passes, the received video data is checked to determine if an error is included, and when the received video data includes abnormal video data, the recording mode of the video communication is performed while inserting preset substitution image data.

43 Claims, 2 Drawing Sheets

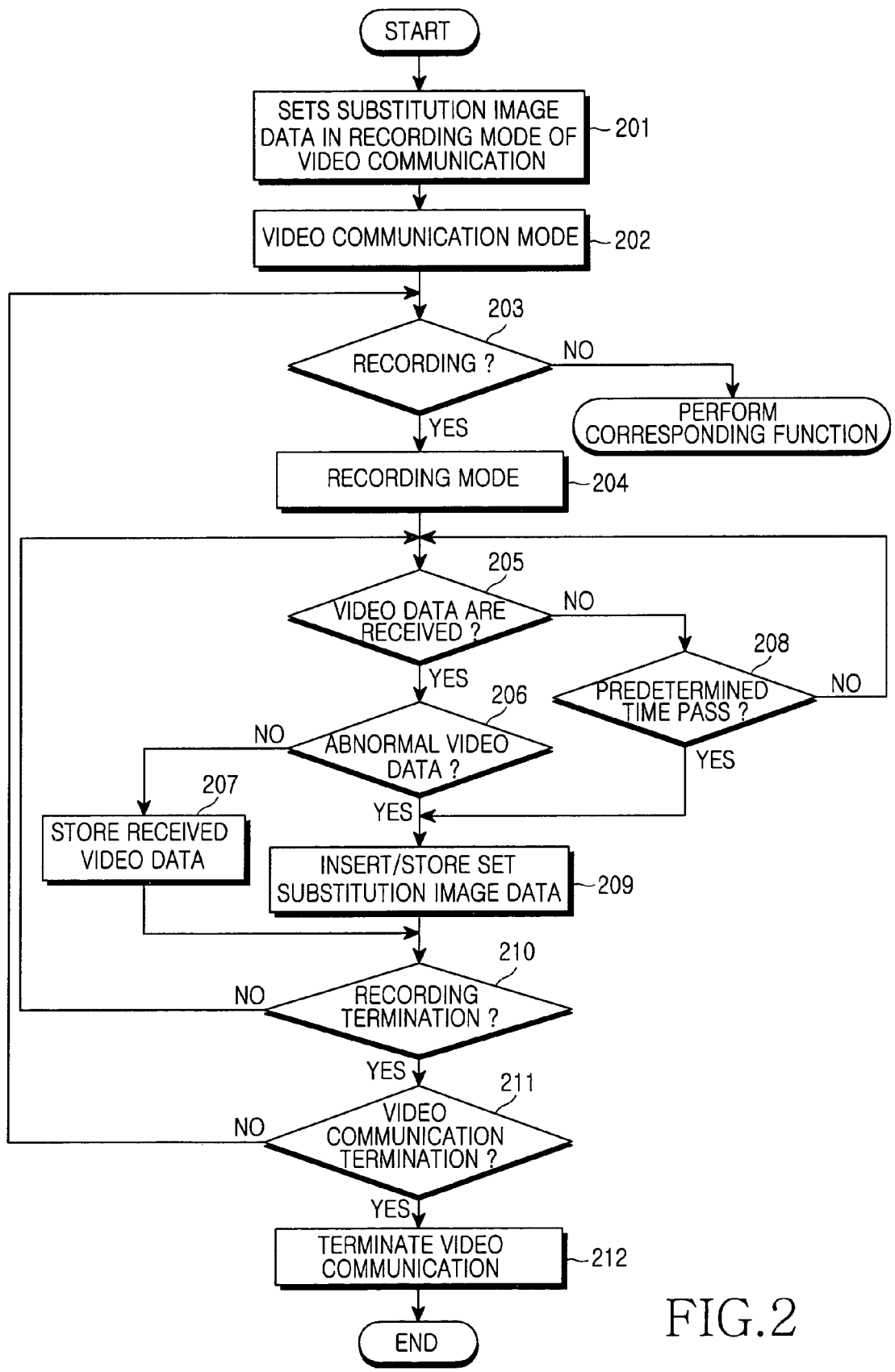

METHOD FOR PERFORMING RECORDING OPERATION IN VIDEO COMMUNICATION MODE OF WIRELESS TERMINAL AND WIRELESS TERMINAL IMPLEMENTING THE SAME

PRIORITY

This application claims the benefit under 35 U.S.C. §119(a) of a Korean Patent Application filed in the Korean Intellectual Property Office on Oct. 24, 2005 and assigned Serial No. 2005-100294, the entire disclosure of which is hereby incorporated by reference.

BACKGROUND OF THE INVENTION

1. Field of the Invention

The present invention relates to a method for performing a recording operation in a video communication mode of a wireless terminal and a wireless terminal implementing the same. More particularly, the present invention relates to a method and wireless terminal for performing a recording operation in a video communication mode of a wireless terminal when abnormal video data are received during the recording operation in the video communication mode of the wireless terminal.

2. Description of the Related Art

Wireless terminals have recently been developed into terminals capable of performing high speed data communication and voice communication. That is, if a mobile communication network of an International Mobile Telecommunications (IMT) 2000 standard is constructed, the mobile communication network may possibly perform high speed data communication and voice communication in a wireless terminal. Data processed by a wireless terminal capable of performing data communication may include packet data and image data. Further, a camera or a TV receiver has been installed in wireless terminals in order to display moving picture signals. Accordingly, wireless terminals equipped with a camera may photograph images and display moving pictures and still pictures, and transmit photographed images to another terminal.

A wireless terminal including a video communication function performs video transmission and reception together with audio transmission and reception. Further, the wireless terminal transmits user video data, that is, video data, receives video data of a communication partner and displays the received video data, and performs communication.

In the video communication mode of the wireless terminal including the video communication function, the wireless terminal provides a recording function capable of recording current video and voice data during video communication. When the wireless terminal performs the recording function in the video communication mode, the wireless terminal generally sets a format of a stored file as "video and voice data" and starts a recording operation.

However, if the recording operation is temporarily paused due to non-reception of video data from a communication partner terminal during the recording operation in the video communication mode, a video file is generated. The video file does not store the video data during the temporary pause time period.

Further, if a temporarily paused state due to non-reception of the video data from the communication partner terminal in the beginning of the recording operation continues to the end of the recording operation, or if the temporary pausing of the recording operation is released, a video file storing no video data is generated, or a video file is generated, which does not store the video data for the temporarily paused time period.

Further, if a video reception state of receiving video and voice data from the communication partner terminal is changed to a video reception state for receiving the voice data due to the change of a video transmission state, depending on transmission or non-transmission of data from the communication partner terminal during the video communication, a video file is generated. The video file does not store the video data for a predetermined time of receiving the voice data.

Moreover, when an error has occurred in the video data received from the communication partner terminal, a video file is generated. The video file stores the video data including the error.

In the video communication mode as described above, if the video file is generated, which does not store the video data during the temporarily paused time period during the recording operation, and is played, or if the video file including abnormal video data is generated and is played, a player may cause a failure or perform an abnormal operation.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method for performing a recording operation in a video communication mode of a wireless terminal when abnormal video data are received during the recording operation in the video communication mode of the wireless terminal.

It is an object of exemplary embodiments of the present invention to provide a method for performing a recording operation in a video communication mode of a wireless terminal, when video data are not received during the recording operation in the video communication mode of the wireless terminal.

In accordance with one aspect of exemplary embodiments of the present invention, there is provided a method for performing a recording operation in a video communication mode of a wireless terminal, in which the video communication mode of the wireless terminal is switched to a recording mode for performing the recording operation video data received in the recording mode of video communication is evaluated, and when the received video data includes abnormal video data, the recording mode of the video communication is performed while inserting preset substitution image data.

In accordance with another aspect of exemplary embodiments of the present invention, there is provided a method for performing a recording operation in a video communication mode of a wireless terminal, in which the video communication mode of the wireless terminal is switched to a recording mode for performing the recording operation, a determination is made as to whether video data are received in the recording mode of video communication, and when the video data are not received and a predetermined time passes, the recording mode of the video communication is performed while inserting preset substitution image data.

In accordance with a further aspect of exemplary embodiments of the present invention, there is provided a method for performing a recording operation in a video communication mode of a wireless terminal, in which the video communication mode of the wireless terminal is switched to a recording mode for performing the recording operation, a determination is made as to whether video data are received in the recording mode of video communication, when the video data are not received and a predetermined time passes, the recording mode of the video communication is performed while inserting preset substitution image data, and when the video data are received before the predetermined time passes, a determination is made as to whether the received video data include an error, and when the received video data include abnormal video data, the recording mode of the video communication is performed while inserting preset substitution image data.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIG. 2 is a flow diagram illustrating a process for performing a recording operation in a video communication mode of a wireless terminal according to an exemplary embodiment of the present invention.

Throughout the drawings, the same reference numerals will be understood to refer to the same elements, features, and structures.

DETAILED DESCRIPTION OF THE PREFERRED EMBODIMENT

Figure 1:
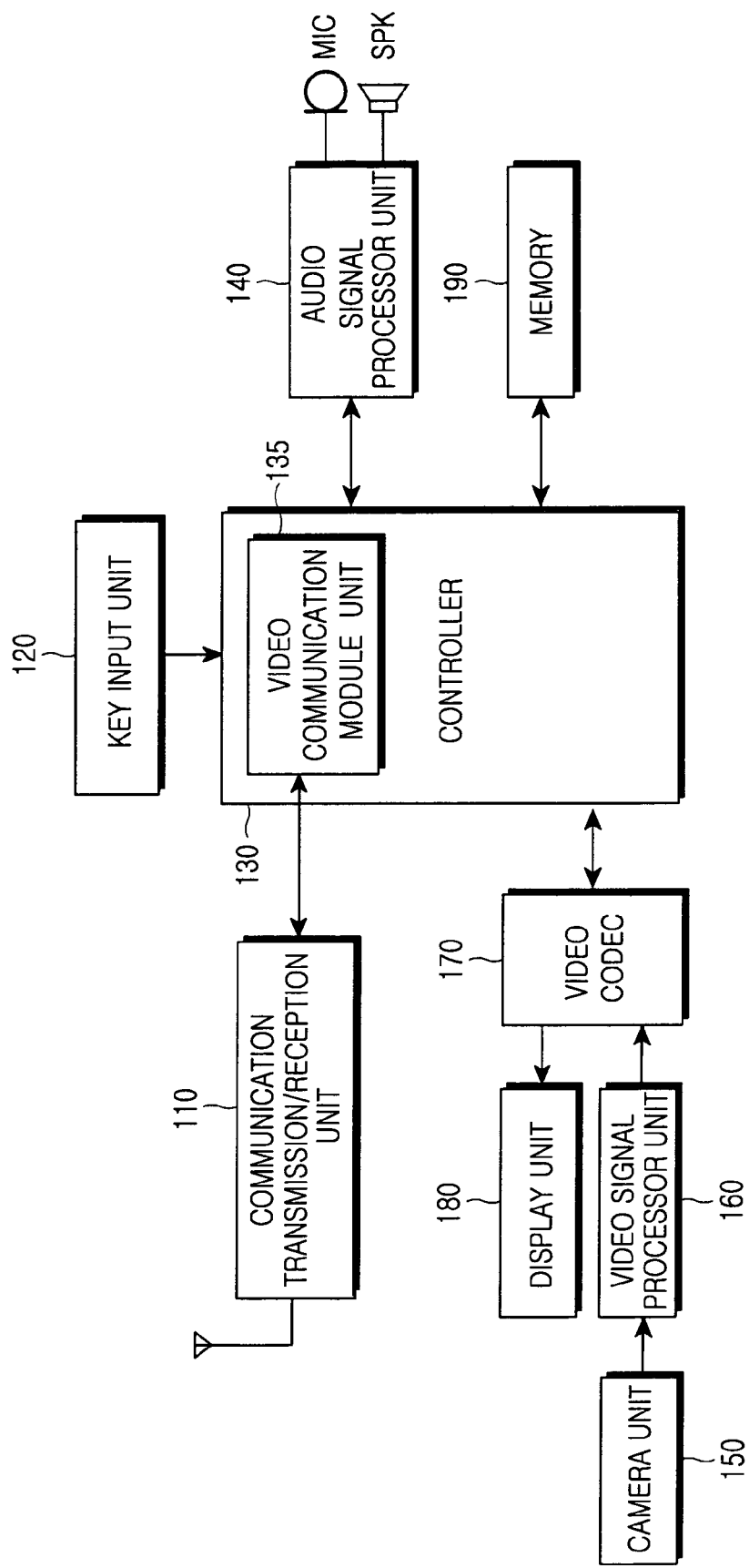
FIG. 1 is a block diagram illustrating the construction of a wireless terminal according to an exemplary embodiment of the present invention.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 is a block diagram illustrating the construction of a wireless terminal according to an exemplary embodiment of the present invention. In an exemplary implementation, the wireless terminal may use a Wideband Code Division Multiple Access (WCDMA) scheme in order to perform video communication.

Referring to FIG. 1, the wireless terminal includes a communication transmission/reception unit 110, key input unit 120, controller 130, video communication module unit 135, audio signal processor unit 140, camera unit 150, video signal processor unit 160, video codec 170, display unit 180, and memory 190.

The communication transmission/reception unit 110 transfers video communication signals received through an antenna to the controller 130, and transmits video communication signals to a base station through the antenna under the control of the controller 130.

The key input unit 120 has a key matrix structure and includes a character key, number key, various function keys, and the like, and outputs key input signals corresponding to keys pressed by a user to the controller 130.

The controller 130 controls the general operation of the wireless terminal according to an exemplary embodiment of the present invention, which may include a video communication module unit 135. According to an exemplary embodiment of the present invention, if abnormal video data are received from a communication partner terminal in a recording mode of video communication, the controller 130 inserts substitution image data of a preset compressed Intra-frame (I-frame) for storage.

According to an exemplary embodiment of the present invention, if video data are not received from the communication partner terminal in the recording mode of the video communication before a predetermined time passes, the controller 130 inserts the substitution image data of the preset compressed I-frame for storage.

Further, according to an exemplary embodiment of the present invention, when inserting and storing the substitution image data in the recording mode of the video communication, the controller 130 can periodically insert and store at least one substitution image data which have been set.

Furthermore, according to an exemplary embodiment of the present invention, when inserting and storing the substitution image data in the recording mode of the video communication, the controller 130 can periodically insert and store at least one substitution image data associated with the data of a communication partner terminal while currently performing the video communication through a phone book.

Moreover, according to an exemplary embodiment of the present invention, if normal video data are received in the recording mode of the video communication before a predetermined time passes, the controller 130 stores data from a compressed I-frame. That is, when video data are not received in the recording mode of the video communication before a predetermined time passes or when normal video data are received before a predetermined time passes while recording is performed with insertion of substitution image data due to reception of abnormal video data, the controller 130 stores data from the compressed I-frame and performs the recording mode.

The video communication module unit 135 demodulates and decodes the video communication signals received in the communication transmission/reception unit 110, thereby dividing the processed signals into an audio source and a video source. The video communication module unit 135 then outputs the audio source and the video source to the audio signal processor unit 140 and the video codec 170, respectively.

Further, the video communication module unit 135 modulates both the video source encoded by the video codec 170 and the audio source encoded by the audio signal processor unit 140, and outputs the modulated sources to the communication transmission/reception unit 110.

The audio signal processor unit 140 decodes the audio source output from the controller 130 into audio signals, converts the audio signals into analog signals, and outputs the analog signals through a speaker. Further, the audio signal processor unit 140 converts voice signals input through a microphone into digital signals, encodes the digital signals into an audio source, and outputs the audio source.

The audio signal processor unit 140 may include codecs. The codecs may include a data codec for processing packet data and an audio codec for processing audio signals such as voice. The codecs may also be included in the controller 130.

The camera unit 150 converts optical signals of an object photographed through its lens into electrical image signals, and outputs the electrical image signals to the video signal processor unit 160.

The video signal processor unit 160 converts the electrical image signals input from the camera unit 150 into video signals, which are digital signals, and outputs the video signals to the video codec 170.

The video codec 170 compresses the video signals input from the video signal processor unit 160, encodes the compressed video signals into a video source, and outputs the encoded video source to the controller 130.

The display unit 180 may be constructed by a Liquid Crystal Display (LCD) and outputs various display data generated in the wireless terminal. When the LCD includes a touch screen function, the display unit 180 may also operate as an input unit.

The memory 190 may include a program memory and a data memory, which both stores various information necessary for controlling the operation of the wireless terminal and various information selected based on user selection information according to an exemplary embodiment of the present invention. That is, the memory 190 includes both a Read Only Memory (ROM) for storing an operation algorithm accessed through the controller 130 for a generation operation of the wireless terminal, and a Random Access Memory (RAM) for storing data according to control commands in a data processor of the controller 130.

The memory 190 may store image data of a still picture set as the substitution image data in the recording mode of the video communication and the substitution image data obtained by converting the image data into the compressed data of an I-frame.

Further, the memory 190 may store a phone book associated with the substitution image data according to an exemplary embodiment of the present invention. The memory 190 may also store a video file storing the substitution image data inserted in the recording mode of the video communication according to an exemplary embodiment of the present invention.

FIG. 2 is a flow diagram illustrating a process for performing the recording operation in the video communication mode of the wireless terminal according to an exemplary embodiment of the present invention.

Referring to FIGS. 1 and 2, in step 201, the controller 130 sets substitution image data to be inserted and stored in the recording mode of video communication. That is, in step 201, the controller 130 sets image data, which are at least one still picture (JPEG), as the substitution image data. The image data may be set as basic substitution image data, or at least one image data associated with corresponding data stored in a phone book may be set as substitution image data. That is, when the at least one image data set as the substitution image data represent a specific user, the controller 130 associates the substitution image data to a phone book for storing the information of the specific user. When it is necessary to insert the substitution image data in the recording mode of the video communication, the controller 130 then searches for the user of a communication partner terminal during the video communication through the phone book, thereby inserting and storing substitution image data associated with the user of the communication partner terminal.

In step 201, the controller 130 may change the image data of the still picture set as the substitution image data in the recording mode of the video communication into a compressed I-frame. The compressed I-frame represents compression data actually inserted as the substitution image data and stored in the recording mode of the video communication. Commonly, a video file recorded and stored in the recording mode of the video communication compresses video data into an I-frame and a Predictive-frame (P-frame), and stores the I-frame and the P-frame. The substitution image data are inserted as the I-frame data, which correspond to the compression data of the video file, and stored together with normal video data compressed into the I-frame and the P-frame.

Further, the controller 130 may change the image data preset as the substitution image data in the video communication mode into an I-frame compressed in a video communication mode of step 202. The controller 130 may set image data as substitution image data in the video communication mode, and change the set image data into the compressed I-frame.

The controller 130 may also change the image data preset as the substitution image data in the video communication mode into an "I-frame" compressed in a recording mode of video communication in step 204. The controller 130 may set image data as substitution image data in the recording mode of the video communication, and change the set image data into the compressed "I-frame".

After the controller 130 sets the substitution image data in the recording mode of the video communication in step 201, if a recording operation is selected in step 202 in which the wireless terminal enters the video communication mode, the controller 130 detects the change of the mode in step 203 and switches the mode of the wireless terminal to the recording mode of the video communication in step 204.

If video data are received from the communication partner terminal, which performs the video communication, the controller 130 detects in the recording mode of the video communication the reception of the video data and checks (that is, evaluates) the status of the video data in step 205. The status of the video data may be determined by checking an error within the video data received from the communication partner terminal in the video communication mode. In an exemplary implementation, an operation for checking the error within the video data received from the communication partner terminal in the video communication mode will be described. First, the video data input through the camera of the communication partner terminal are encoded through a video codec. The communication partner terminal then adds a sequential number representing a transmission order to the encoded data, and multiplexes the encoded data, thereby generating a series of data sequence. Further, the communication partner terminal generates a Cyclic Redundancy Checking (CRC) in order to allow the wireless terminal to check existence or absence of an error within the data, adds the CRC to the generated data sequence, and transmits the data sequence to the wireless terminal through a wireless network. Since this process is disclosed in the specification of an H.232 which belongs to an H.324M protocol, the details will be omitted for clarity and conciseness.

When the video data are received from the communication partner terminal, the controller 130 of the wireless terminal demultiplexes the header of the video data, and checks the sequential number and the CRC, thereby checking if an error exists in the received video data.

If an error does not exist in the received video data, the controller 130 determines the received video data as normal video data in step 206, and displays and stores the received video data in step 207. In step 207, the normal video data are compressed into an I-frame and a P-frame for storage. Herein, the controller 130 starts storage of data from the compressed I-frame and performs the recording mode.

However, if an error exists in the received video data, the controller 130 checks if the error is larger than a preset threshold value. If the error is less than the preset threshold value, the controller 130 determines the received video data as normal video data. However, if the error is larger than the preset threshold value, the controller 130 determines the received video data as abnormal video data in step 206 and performs step 209.

On the other hand, if video data are not received from the communication partner terminal, which performs the video communication, in the recording mode of the video communication in step 204, the controller 130 detects non-reception of the video data, operates a timer, and checks if video data are received before a predetermined time (for example, about 1 or 2 seconds) passes, in step 205. If video data are not received before the predetermined time passes, the controller 130 detects the non-reception of the video data in step 208 and performs step 209.

In step 209, the controller 130 inserts the substitution image data (that is, compressed I-frame) stored in the memory 190, and stores the compressed I-frame. The compressed I-frame data may include at least one substitution image data which have been set, or at least one corresponding substitution image data set in connection with a predetermined user who currently performs video communication through the phone book of the wireless terminal.

In step 209, the controller 130 controls a time (that is, an insertion time point), at which the substitution image data are inserted, to be stored in the header of the video file generated in the recording mode of the video communication.

While steps 204 to 209 are performed, the normal video data received before a predetermined time passes are compressed into the I-frame and the P-frame. When video data are not received before the predetermined time passes or abnormal video data are received, the substitution image data of the preset compressed I-frame are inserted, thereby generating the video file.

If a recording termination is selected in the recording mode of the video communication, the controller 130 detects the selection of the recording termination, terminates the recording mode of the video communication, and switches the mode of the wireless terminal to the video communication mode for displaying the video data received from the communication partner terminal on the display unit 180, in step 210. If a video communication termination is selected in the video communication mode, the controller 130 detects the selection of the video communication termination in step 211 and terminates the video communication in step 212.

When the video file generated through the process, as illustrated in FIG. 2, is played and if the insertion time point of the substitution image data is reached during the play of the normal video data, a player plays and displays the substitution image data of the compressed I-frame.

According to an exemplary embodiment of the present invention as described above, when abnormal video data are received through a recording function in a video communication mode of a wireless terminal or when reception of video data is temporarily paused, substitution image data are inserted in order to generate a video file. Accordingly, when the video file is played, the inserted substitution image data are played at a time point at which the abnormal video data are received or the reception of the video data is temporarily paused, thereby preventing an error from occurring in the player.

While the invention has been shown and described with reference to certain exemplary embodiments thereof, it will be understood by those skilled in the art that various changes in form and details may be made therein without departing from the scope and spirit of the invention as defined by the appended claims.

What is claimed is:

1. A method for performing a recording operation in a video communication mode of a wireless terminal, the method comprising:
   switching the video communication mode of the wireless terminal to a recording mode for performing the recording operation;
   evaluating video data received in the recording mode of video communication; and
   when the received video data comprises erroneous video data, performing the recording mode of the video communication while inserting preset substitution image data.

2. The method as claimed in claim 1, further comprising presetting the substitution image data of image data inserted, when erroneous video data is received.

3. The method as claimed in claim 2, further comprising converting the image data preset as the substitution image data to compressed I-frame data corresponding to a codec, the compressed I-frame data being transmitted and received in the video communication mode.

4. The method as claimed in claim 1, wherein the substitution image data is set in connection with a phone book of the wireless terminal.

5. The method as claimed in claim 1, further comprising converting image data preset as the substitution image data in the video communication mode to compressed I-frame data corresponding to a codec, the compressed I-frame data being transmitted and received in the video communication mode.

6. The method as claimed in claim 1, further comprising setting the substitution image data of image data inserted, when erroneous video data is received in the video communication mode.

7. The method as claimed in claim 6, further comprising converting the image data set as the substitution image data to compressed I-frame data corresponding to a codec, the compressed I-frame data being transmitted and received in the video communication mode.

8. The method as claimed in claim 1, further comprising converting image data preset as the substitution image data in the recording mode of the video communication to compressed I-frame data corresponding to a codec, the compressed I-frame data being transmitted and received in the video communication mode.

9. The method as claimed in claim 1, further comprising setting the substitution image data of image data inserted, when erroneous video data is received in the recording mode of the video communication.

10. The method as claimed in claim 9, further comprising converting the image data set as the substitution image data to compressed I-frame data corresponding to a codec, the compressed I-frame data being transmitted and received in the video communication mode.

11. The method as claimed in claim 1, wherein the performing of the recording mode comprises:
    when the received video data comprises erroneous video data, periodically inserting the substitution image data for storage; and
    when the substitution image data is stored, storing a storage time information of the substitution image data in a header of a video file generated by performing the recording mode of the video communication.

12. The method as claimed in claim 11, wherein, when the received video data comprises erroneous video data, during the video communication, data of a communication partner is searched from a phone book of the wireless terminal, and at least one substitution image data set in connection with the searched data of the communication partner is periodically inserted and stored.

13. The method as claimed in claim 1, further comprising, when the received video data comprises normal video data, performing the recording mode while storing data from a compressed I-frame.

14. A method for performing a recording operation in a video communication mode of a wireless terminal, the method comprising:
    switching the video communication mode of the wireless terminal to a recording mode for performing the recording operation;
    determining if video data is received in the recording mode of video communication; and
    when the video data is not received and a reference time passes, performing the recording mode of the video communication while inserting preset substitution image data.

15. The method as claimed in claim 14, further comprising presetting the substitution image data of image data inserted, when the video data is not received and the reference time passes.

16. The method as claimed in claim 15, further comprising converting the image data preset as the substitution image data to compressed I-frame data corresponding to a codec, the compressed I-frame data being transmitted and received in the video communication mode.

17. The method as claimed in claim 14, wherein the substitution image data is set in connection with a phone book of the wireless terminal.

18. The method as claimed in claim 14, further comprising converting image data preset as the substitution image data in the video communication mode to compressed I-frame data corresponding to a codec, the compressed I-frame data being transmitted and received in the video communication mode.

19. The method as claimed in claim 14, further comprising setting the substitution image data of image data inserted, when the video data is not received and the reference time passes in the video communication mode.

20. The method as claimed in claim 19, further comprising converting the image data set as the substitution image data to compressed I-frame data corresponding to a codec, the compressed I-frame data being transmitted and received in the video communication mode.

21. The method as claimed in claim 14, further comprising converting image data preset as the substitution image data in the recording mode of the video communication to compressed I-frame data corresponding to a codec, the compressed I-frame data being transmitted and received in the video communication mode.

22. The method as claimed in claim 14, further comprising setting the substitution image data of image data inserted, when the video data is not received and the reference time passes in the recording mode of the video communication.

23. The method as claimed in claim 22, further comprising converting the image data set as the substitution image data to compressed I-frame data corresponding to a codec, the compressed "I-frame" data being transmitted and received in the video communication mode.

24. The method as claimed in claim 14, wherein the performing of the recording mode comprises:
    when the video data is not received and the reference time passes, periodically inserting the substitution image data for storage; and
    when the substitution image data is stored, storing a storage time information of the substitution image data in a header of a video file generated by performing the recording mode of the video communication.

25. The method as claimed in claim 24, wherein, when the video data is not received and the reference time passes, data of a communication partner, during the video communication, is searched from a phone book of the wireless terminal, and at least one substitution image data set in connection with the searched data of the communication partner is periodically inserted and stored.

26. The method as claimed in claim 14, further comprising, when the video data is received before the reference time passes, performing the recording mode while starting storage of data from a compressed I-frame.

27. A method for performing a recording operation in a video communication mode of a wireless terminal, the method comprising:
    switching the video communication mode of the wireless terminal to a recording mode for performing the recording operation;
    determining if video data is received in the recording mode of video communication;
    when the video data is not received and a reference time passes, performing the recording mode of the video communication while inserting preset substitution image data; and
    when the video data is received before the reference time passes, determining if the received video data comprises an error, and when the received video data erroneous video data, performing the recording mode of the video communication while inserting preset substitution image data.

28. The method as claimed in claim 27, further comprising presetting the substitution image data of image data inserted, when at least one of the video data is not received and the reference time passes, and erroneous video data is received.

29. The method as claimed in claim 28, further comprising converting the image data preset as the substitution image data to compressed I-frame data corresponding to a codec, the compressed I-frame data being transmitted and received in the video communication mode.

30. The method as claimed in claim 27, wherein the substitution image data is set in connection with a phone book of the wireless terminal.

31. The method as claimed in claim 27, further comprising converting image data preset as the substitution image data in the video communication mode to compressed I-frame data corresponding to a codec, the compressed I-frame data being transmitted and received in the video communication mode.

32. The method as claimed in claim 27, further comprising setting the substitution image data of image data inserted when at least one of the video data is not received and the reference time passes, and erroneous video data is received in the video communication mode.

33. The method as claimed in claim 32, further comprising converting the image data set as the substitution image data to compressed I-frame data corresponding to a codec, the compressed I-frame data being transmitted and received in the video communication mode.

34. The method as claimed in claim 27, further comprising converting image data preset as the substitution image data in the recording mode of the video communication to compressed I-frame data corresponding to a codec, the compressed I-frame data being transmitted and received in the video communication mode.

35. The method as claimed in claim 27, further comprising setting the substitution image data of image data inserted when at least one of the video data is not received and the reference time passes, and erroneous video data is received in the recording mode of the video communication.

36. The method as claimed in claim 35, further comprising converting the image data set as the substitution image data to compressed I-frame data corresponding to a codec, the compressed I-frame data being transmitted and received in the video communication mode.

37. The method as claimed in claim 27, wherein the performing of the recording mode comprises:
when at least one of the video data is not received and the reference time passes, and the received video data comprises erroneous video data, periodically inserting the substitution image data for storage; and
when the substitution image data is stored, storing a storage time information of the substitution image data in a header of a video file generated by performing the recording mode of the video communication.

38. The method as claimed in claim 37, wherein, when at least one of the video data is not received and the reference time passes, and the received video data comprises erroneous video data, data of a communication partner, during the video communication, is searched from a phone book of the wireless terminal, and at least one substitution image data set in connection with the searched data of the communication partner is periodically inserted and stored.

39. The method as claimed in claim 27, further comprising, when the received video data comprises normal video data before the reference time passes, performing the recording mode while storing data from a compressed I-frame.

40. A wireless terminal, comprising
a controller for switching the video communication mode of the wireless terminal to a recording mode for performing the recording operation,
wherein the controller determines if video data is received in the recording mode of video communication, when the video data is not received and a reference time passes, the recording mode of the video communication is performed while inserting preset substitution image data; and when the video data is received before the reference time passes, a determination is made as to whether the received video data comprises an error, and when the received video data comprises erroneous video data, the recording mode of the video communication is performed while inserting preset substitution image data.

41. The wireless terminal in claim 40, wherein the controller presets the substitution image data of image data inserted, when at least one of the video data is not received and the reference time pass, and erroneous video data is received.

42. The wireless terminal in claim 40, wherein the controller converts the image data preset as the substitution image data to compressed I-frame data corresponding to a codec, the compressed I-frame data being transmitted and received in the video communication mode.

43. The wireless terminal in claim 40, wherein the substitution image data is set in connection with a phone book of the wireless terminal.

* * * * *